United States Patent [19]

Hügi

[11] Patent Number: 5,676,227
[45] Date of Patent: Oct. 14, 1997

[54] FREE-WHEEL HUB FOR BICYCLES

[75] Inventor: Wilfried Hügi, Morschach, Switzerland

[73] Assignee: DT-Bike Technology AG), Biel, Switzerland

[21] Appl. No.: 565,004

[22] Filed: Nov. 30, 1995

[30]       Foreign Application Priority Data

Dec. 2, 1994 [DE] Germany .................. 9419357 U

[51] Int. Cl.$^6$ ........................................ F16D 41/24
[52] U.S. Cl. .................. 192/64; 192/46; 301/110.5; 301/124.2
[58] Field of Search ........................ 192/64, 46, 110 B, 192/69.81; 301/105.1, 110.5, 111, 124.2

[56]           References Cited

U.S. PATENT DOCUMENTS

| 2,211,548 | 8/1940 | Schwinn | 192/64 |
| 4,567,973 | 2/1986 | Butz | 192/64 |
| 4,580,670 | 4/1986 | Nagano | 192/64 |

FOREIGN PATENT DOCUMENTS

| 522983 | 1/1993 | European Pat. Off. | 192/46 |
| 449475 | 6/1949 | Italy | 192/64 |
| 666454 | 7/1988 | Switzerland . | |

Primary Examiner—Richard M. Lorence
Attorney, Agent, or Firm—Ladas & Parry

[57]            ABSTRACT

A wheel hub for a bicycle wheel has a hub shell for receiving spokes of the wheel and a sprocket body receives the sprockets. The wheel hub and the sprocket body are connected through a free-wheel clutch. The roller bearings of the sprocket body are freely axially displaceable on the axle. An end member of the hub is screwed onto the sprocket-side end of the axle and acts as a locking device for pressing the sprocket body against the hub shell. To access the clutch and for disassembling the hub, the end member can be screwed off and the sprocket body can be pulled off the axle by hand. This simplifies assembly, disassembly and maintenance of the hub.

15 Claims, 2 Drawing Sheets

FREE-WHEEL HUB FOR BICYCLES

BACKGROUND OF THE INVENTION

1. Field of the Invention

The invention relates to a free-wheel hub for bicycles, such as used for the wheel of the bicycle driven by the chain. Such a free-wheel hub transmits the driving force from the sprocket to the wheel while the bicyclist is pedaling, but it allows a free rotation of the wheel while the bicyclist in not pedaling.

2. Description of the Prior Art

A known free-wheel hub of this kind is described in the Swiss patent CH 666 454. The assembly, replacement and maintenance of this hub is, however, difficult and requires special tools.

In known free-wheel hubs, the roller bearings of the sprocket body are tightly pressed into the sprocket body and onto the axle and thereby fixedly connected thereto. For displacing them along the axle during assembly and disassembly of the hub, dedicated tools are required that are capable of exerting substantial axial forces onto the bearings.

SUMMARY OF THE INVENTION

Hence, it is a general object of the invention to provide a free-wheel hub that is easy to assemble and to disassemble.

Now, in order to implement these and still further objects of the invention, which will become more readily apparent as the description proceeds, the free-wheel hub comprises an axle, a hub shell rotatably arranged on said axle, a sprocket body for carrying sprockets, said sprocket body being mounted on said axle by means of an inner and an outer roller bearing and being freely displaceable along said axle away from said hub shell and thereby removable from said axle, a clutch arranged between said hub shell and said sprocket body for coupling said sprocket body to said hub shell in a first direction of rotation while allowing a free movement in a second direction of rotation, and a releasable locking means for urging said sprocket body against said hub into an operating position.

In such an arrangement the sprocket body is held in position by the locking means during normal operation. Upon release of the locking means, the sprocket body can be freely moved axially away from the hub shell, e.g. by hand, which simplifies the assembly, disassembly and maintenance of the hub.

Preferably, the sprocket body is connected to the axle by means of two toiler bearings, which should be pressed tightly into, or in any other way tightly connected to, the sprocket body, while they are freely displaceable along at least part of the axle. Such roller bearings pressed tightly into the sprocket body can only be removed from the sprocket body upon application of considerable force. A sprocket body built in this way can therefore be removed from the axle together with its bearings.

The locking means is preferably attachable to the axle, e.g. by being screwed onto it. It should exert an axial force onto the outer roller bearing of the sprocket body. To prevent shearing forces acting on the roller bearings, spacer tubes should be provided which directly or indirectly transmit this axial force onto the axle such that it is not acting on the sprocket body.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
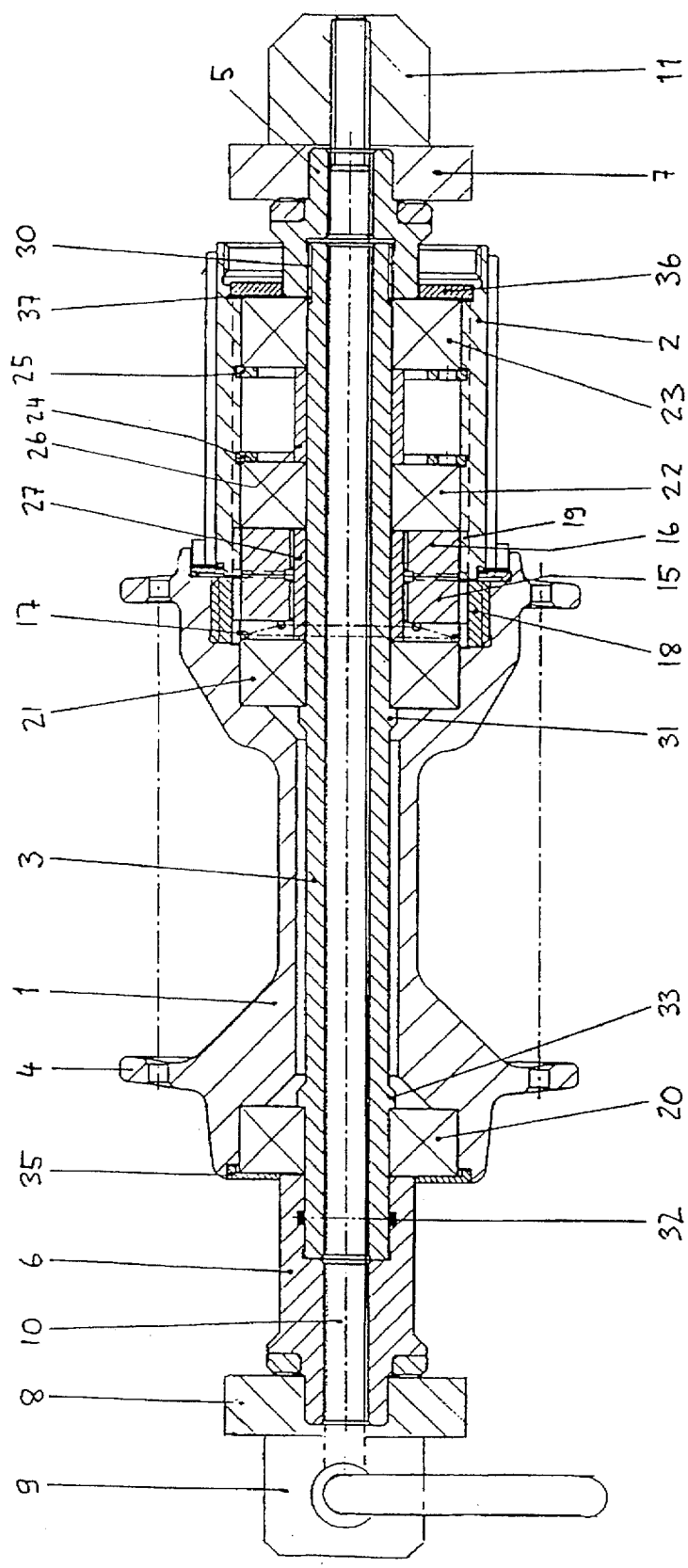
FIG. 1 is a sectional view of a hub according to the invention.

As shown in FIG. 1, the free-wheel hub comprises a substantially cylindrical hub shell 1 and a sprocket body 2, both of which are mounted on a substantially cylindrical axle 3. In the present embodiment, hub shell 1 is provided with holes 4 for receiving the spokes (not shown) of a bicycle wheel. Sprocket body 2 carries on its outer side one or more sprocket wheels (not shown) for receiving the driving chain. Two lateral end members 5 and 6 on the hub form extensions of the axle and are connected to the legs 7 and 8 of the fork, usually the fork of the bicycle's rear wheel. A clamping device of known design consisting of ahead 9, an axial rod 10 extending through the axle and a foot 11 is used for axially compressing the hub between the legs 7, 8 of the fork.

A free-run clutch is arranged between sprocket body 2 and hub shell 1 for connecting the sprocket body 2 to the hub shell 1 in one relative direction of rotation while allowing a free rotation of the hub shell in the other direction of rotation. The clutch comprises two gear rings 15, 16 lying side by side with interlocking toothed side surfaces. The teeth are formed such that they provide a rotationally rigid connection in one relative rotational direction, while the gear rings are urged apart during movement in the other relative rotational direction. For this purpose, the inner gear ring 15 is axially displaceable and pushed against the outer gear ring 16 by means of a spring 17. Both gear rings are engaging in axial notches 18, 19 of the hub shell 1 or the sprocket body 2, respectively, these notches forming rotationally rigid connections to the respective parts.

Hub shell 1 is mounted on two hub shell roller bearings 20, 21. These roller bearings 20, 21 are tightly pressed into hub shell 1 and thereby rigidly connected thereto. Their inner diameter is, however, about 0.005–0.01 mm larger than the outer diameter of axle 3 such that they are freely displaceable along the axle without having too much clearance.

Two further roller bearings 22, 23 are provided for mounting sprocket body 2 on axle 3. Roller bearings 22, 23 are tightly pressed into a cylindrical axial opening of sprocket body 2 and thereby rigidly connected thereto. Two locking rings 24, 25 are provided for simplifying axial placement while the bearings are pressed into the sprocket body.

A spacer tube 26 is arranged between roller bearings 22 and 23. It is slightly longer than the outer distance of locking rings 24, 25 such that it is clamped between bearings 22, 23 while these are pressed into sprocket body 2. A second spacing tube 27 is positioned between the inner roller bearing 22 of the sprocket body and the sprocket side roller bearing 21 of the hub shell.

The inner diameter of roller bearings 22 and 23 as well as of spacer tubes 26 and 27 is about 0.005–0.1 mm larger than the outer diameter of axle 3, such that they are freely displaceable along the axle without having too much clearance.

Sprocket-side end member 5 is a nut screwed on a threading 30 of the sprocket-side end of axle 3. After assembly of the hub, end member 5 is screwed tightly onto axle 3 and acts as a locking means for sprocket body 2. It exerts an axial force onto the inner ring of roller bearing 23, from where this force is transmitted to spacer tube 26, the inner ring of roller bearing 22, spacer tube 27, the inner ring of roller bearing 21 and to a stop 31 arranged on axle 3. Therefore, the axial force from end member 5 is led through the sprocket body without causing shearing forces in the roller bearings. The axial force guarantees that the inner rings of the roller bearings 21–23 are rotating with the axle 3.

The second end member 6 is resting on the other end of axle 3. It encloses axle 3 with some clearance such that it is axially displaceable along axle 3. An O-ring 32 is arranged in an inner notch of end member 6 for providing a frictional contact between end member 6 and axle 3 such that end member 6 does not fall from the axle upon loosening the clamping device.

During operation, clamping device 9–11 exerts an axial pressing force onto end member 6. This force is transmitted to the inner ring of roller bearing 20 and from there to a stop 33 arranged on axle 3.

Sealings 35–37 are provided at both ends of the hub for protection of its interior.

For disassembly of sprocket body 2, clamping device 9–11 is loosened and the wheel is removed from the fork. Then, the end of the axle lying opposite sprocket body 2 is held tight and end member 5 is screwed off. Now the whole Sprocket body 2 together with roller bearings 22, 23, spacer tube 26 and gear ring 16 can easily be pulled from the cylindrical sprocket-side end of axle 3. Because bearings 22, 23 and spacing tube 26 are only sitting loosely on axle 3, this operation can be carried out by hand. After removing sprocket body 2 from axle 3, the gearing mechanism can be accessed for maintenance or replacement.

During assembly of the hub, sprocket body 2 together with roller bearings 22, 23, spacing tube 26 and gear rings 16 is pushed back onto axle 3 and locked by means of end member 5. While screwing end member 5 onto axle 3, axle 3 must again be held tightly.

Figure 2:
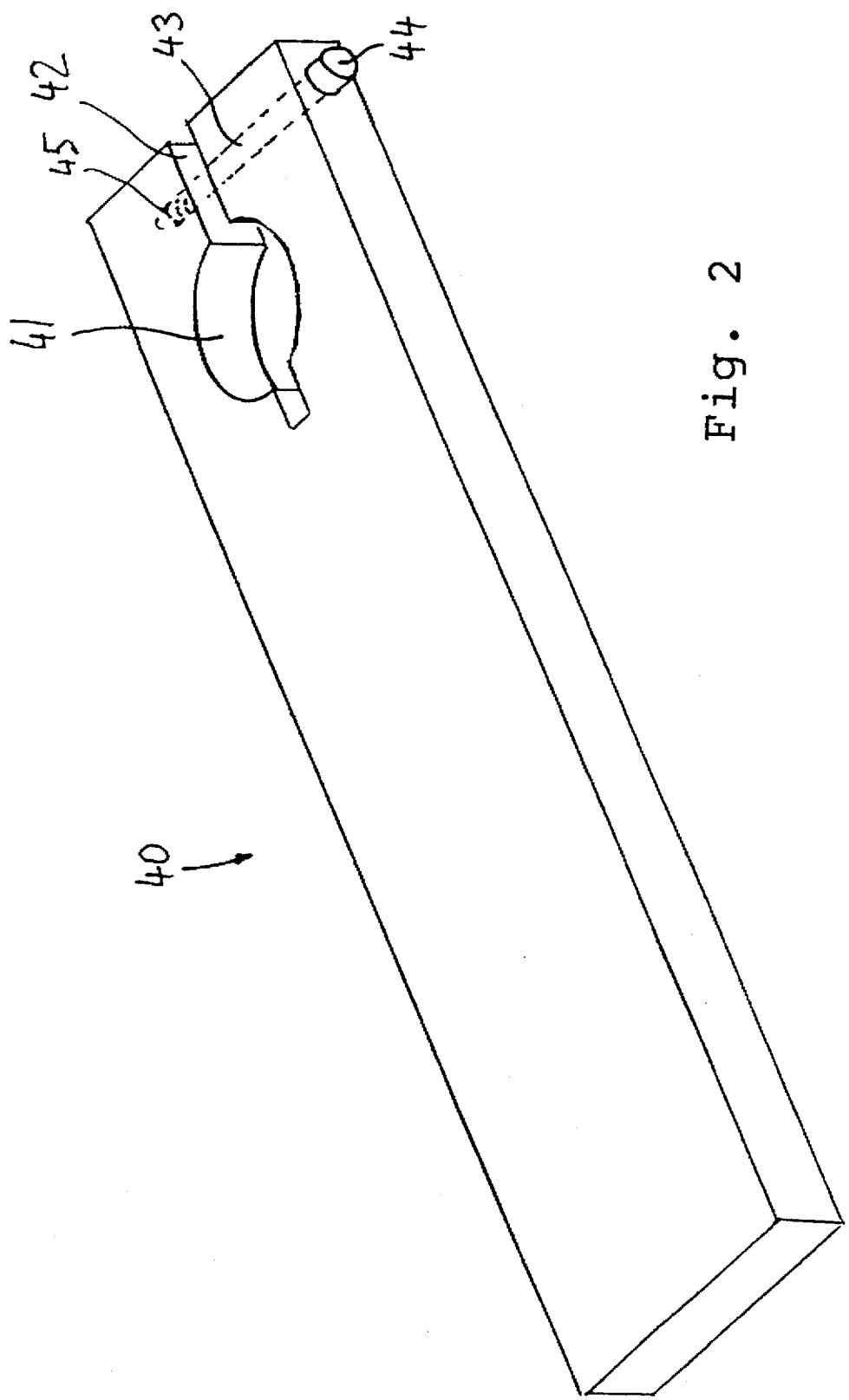
FIG. 2 shows a tool for holding the axle.

For holding axle 3 during screwing off end member 5, a vise or a suitable pair of tongues can be used. Preferably, however, a clamping tool 40 as shown in FIG. 2 is used. This tool consists of an elongate metal body With a hole 41 at one end. This hole has a diameter slightly larger than the axle and can be slid onto the axle. A notch 42 extends from the end of the metal body into hole 41. A borehole 43 exerts perpendicularly through this notch 42. A screw 44 is arranged in bore hole 43 and engages a threading 45. Tightening screw 44 leads to a contraction of notch 42 and clamps axle 3 in hole 41 without damaging the axle. Because of its simplicity tool 40 is easy to use and reliable.

While there is shown and described a presently preferred embodiment of the invention, it is to be distinctly understood that the invention is not limited thereto but may be otherwise variously embodied and practiced within the scope of the following claims.

What is claimed is:

1. A free-wheel hub for a bicycle comprising:
   an axle,
   a hub shell rotatably arranged on said axle,
   a sprocket body for carrying sprockets, said sprocket body being mounted on said axle by means of an inner and an outer roller bearing,
   a clutch arranged between said hub shell and said sprocket body for coupling said sprocket body to said hub shell in a first direction of rotation while allowing a free movement in a second direction of rotation,
   a releasable locking means for urging said sprocket body against said hub shell in an operating position,
   a first spacer tube arranged between said inner and said outer roller bearing, and
   a second spacer tube arranged on a clutch side of said inner roller bearing,
   wherein in an unlocked state of said locking means, said sprocket body is freely displaceable along said axle away from said hub shell and thereby removable from said axle.

2. The free-wheel hub of claim 1 wherein said axle comprises a cylindrical section having a constant diameter and wherein said roller bearings are tightly pressed into said sprocket body and in said operating position said roller bearings are both disposed around said cylindrical section of said axle, wherein an outer diameter of said axle in said cylindrical section is smaller than an inner diameter of said roller bearings for allowing a free displacement of said roller bearings along said axle.

3. The free-wheel hub of claim 1 wherein said locking means is attachable to said axle and axially urgeable against said outer roller bearing.

4. The free-wheel hub of claim 1 wherein said locking means is attachable to said axle and axially urgeable against said outer roller bearing for exerting a first axial force against said roller bearing, said first spacer tube, said inner roller bearing and said second spacer tube, and wherein said axle comprises a first stop for transferring said first axial force to said axle.

5. The free-wheel hub of claim 4 comprising a first hub shell roller bearing connected to said hub shell and being freely displaceable along said axle in unlocked state, wherein in said operating position said first hub shell roller bearing is arranged between said second spacer tube and said stop.

6. The free-wheel hub of claim 1 wherein said locking means comprises a first nut screwed onto a first end of said axle.

7. The free-wheel hub of claim 1 comprising
   an end member pressed onto a second end of said axle, and
   a second hub shell roller bearing connected to said hub shell and freely displaceable along said axle in unlocked state,
   wherein said axle comprises a second stop and wherein in said operating position said end member exerts a second axial force onto said second hub shell roller bearing and said second, hub shell roller bearing exerts said second axial force against said second stop.

8. The free-wheel hub or claim 7 wherein said second hub shell roller bearing is tightly pressed into said hub shell.

9. The free-wheel hub of claim 1 wherein said hub shell comprises means for receiving spokes.

10. The free-wheel hub of claim 1 wherein an inner diameter of said roller bearings is between 0.005 and 0.01 mm larger than an outer diameter of said axle.

11. A free-wheel hub for a bicycle comprising:
    an axle having a cylindrical section of constant diameter,
    a hub shell rotatably arranged on said axle,
    a sprocket body for carrying sprockets, said sprocket body being mounted on said axle by means of an inner and an outer roller bearing,
    a clutch arranged between said hub shell and said sprocket body for coupling said sprocket body to said hub shell in a first direction of rotation while allowing a free movement in a second direction of rotation, and a releasable locking means for urging said sprocket body against said hub shell in an operating position, wherein in an unlocked state of said locking means said sprocket body is freely displaceable along said axle away from said hub shell and thereby removable from said axle, and wherein said roller bearings are tightly pressed into said sprocket body and in said operating position, said roller bearings are body disposed around said cylindrical section of said axle, wherein an outer diameter of said axle in said cylindrical section is smaller than an inner diameter of said roller bearings for allowing a free displacement of said roller bearings along said cylindrical section of said axle in said unlocked state of said locking means for removal of said sprocket body.

12. The free-wheel hub of claim 11 comprising a first spacer tube arranged between said roller bearings and a second spacer tube arranged adjacent to and on a clutch side of said inner roller bearing.

13. The free-wheel hub of claim 11 wherein said clutch comprises a first gear ring connected to said hub shell and a second gear ring connected to said sprocket body, said gear rings comprising interlocking toothed side faces, wherein said gear rings are elastically pressed against each other.

14. The free-wheel hub of claim 1 wherein said locking means exerts an axial force against inner rings of said roller bearings.

15. The free-wheel hub of claim 11, wherein an inner diameter of said roller bearings is between 0.0005 and 0.01 mm larger than an outer diameter of said axle.

* * * * *